US006959376B1

(12) United States Patent
Boike et al.

(10) Patent No.: US 6,959,376 B1
(45) Date of Patent: Oct. 25, 2005

(54) INTEGRATED CIRCUIT CONTAINING MULTIPLE DIGITAL SIGNAL PROCESSORS

(75) Inventors: Mark Boike, Plano, TX (US); Alan Phan, Rowlett, TX (US); Keith Dang, Lewisville, TX (US); Charles H. Stewart, Richardson, TX (US)

(73) Assignee: LSI Logic Corporation, Milpitas, CA (US)

( * ) Notice: Subject to any disclaimer, the term of this patent is extended or adjusted under 35 U.S.C. 154(b) by 735 days.

(21) Appl. No.: 09/975,677

(22) Filed: Oct. 11, 2001

(51) Int. Cl.[7] .............................................. G06F 15/16

(52) U.S. Cl. ..................................................... 712/35

(58) Field of Search ........................................ 712/35

(56) References Cited

U.S. PATENT DOCUMENTS

| 5,204,938 | A | * | 4/1993 | Skapura et al. ................ 706/42 |
| 5,293,586 | A | * | 3/1994 | Yamazaki et al. ............ 345/519 |
| 5,497,373 | A | * | 3/1996 | Hulen et al. .................. 370/259 |
| 5,822,606 | A | * | 10/1998 | Morton .......................... 712/16 |
| 6,128,681 | A | * | 10/2000 | Shephard ....................... 710/71 |
| 6,233,643 | B1 | * | 5/2001 | Andrews et al. ............. 710/316 |
| 6,643,803 | B1 | * | 11/2003 | Swoboda et al. .............. 714/38 |

* cited by examiner

Primary Examiner—Eric Coleman
(74) Attorney, Agent, or Firm—Conley Rose P.C.

(57) ABSTRACT

The present invention is an integrated circuit containing multiple digital signal processors (DSPs). A single host processor interface is also placed on the chip to connect the multiple DSPs to the host. A separate direct memory access (DMA) unit is provided for each DSP to facilitate flow of data to and from a data memory for each DSP. Each DSP also includes an instruction memory.

20 Claims, 2 Drawing Sheets

INTEGRATED CIRCUIT CONTAINING MULTIPLE DIGITAL SIGNAL PROCESSORS

FIELD OF THE INVENTION

The invention relates to digital signal processing, and more particularly to integrated circuits containing multiple digital signal processing cores.

BACKGROUND OF THE INVENTION

Digital signal processors (DSPs) are computing devices that process data that has been converted from analog form to digital form. Among the functions typically performed by DSPs are compression and decompression of data and echo cancellation. In traditional applications, one DSP has typically been placed on one integrated circuit chip. Several advantages can be gained by placing multiple DSPs on a single chip rather than having only one DSP on a chip. First, the amount of space on a circuit board taken up by the DSPs is reduced. Under the traditional approach, if four DSPs were needed in a circuit, four separate chips would have to be placed on the circuit board. When four DSPs are placed on a single chip, only one chip is needed instead of four and the amount of space on the circuit board used by the DSPs is reduced accordingly. Electrical energy tends to be wasted by the random access memory, input/output, and other peripherals on each chip and particularly by the input/output ports. The use of a multi-DSP chip reduces this waste by reducing the number of chips on the board. Connections between the multiple DSPs on one chip do not need input/output circuits, but instead operate at the low internal power levels. Thus, the amount of power consumed by the circuit board and the amount of heat generated by the board are reduced. The reductions in space and energy consumption contribute to a cost savings for multi-DSP as opposed to single-DSP chips. The use of multiple DSPs on a single chip instead of on separate chips also increases processing speed by reducing the distance between the DSPs and decreasing the number of interconnections among them.

Prior to the development of the present invention, at least one chip was known to exist that improved on the traditional configuration by placing multiple DSPs on a single chip. The Texas Instruments TMS320VC5441 Fixed-Point Digital Signal Processor contains four DSPs in a single integrated circuit. The TMS320VC5441 is described in a Texas Instruments data manual, Literature Number SPRS122C, which is incorporated herein by reference.

While the Texas Instruments TMS320VC5441 offers the advantages described above, that chip also has several drawbacks. Communication between each DSP and a host processor outside the chip is achieved through a multiplexing unit connected to a host processor interface on each DSP subsystem. Because of the multiplexing function, only one DSP can be accessed at a time, slowing down overall communication speed within the chip. The presence of a host processor interface on each DSP subsystem adds to the complexity of the chip and increases the number of interconnections needed among the components on the chip. Also, the host processor interface on each DSP subsystem shares a data bus with a memory control unit. Because of this configuration, memory access speed is reduced when the host processor interface is active. The present invention overcomes these drawbacks while retaining the advantages previously described.

SUMMARY OF THE INVENTION

The present invention is a system-on-a-chip (SoC) integrated circuit containing multiple digital signal processors (DSPs). In an embodiment of the invention, hereafter referred to as the DSP/SoC, the integrated circuit includes two or more DSPs and a single host processor interface. Each DSP includes its own memory unit and a direct memory access (DMA) device.

Each memory unit may include an instruction memory module and controller, a data memory module and controller, and two or more time division multiplexing devices serving as serial port interfaces to couple data to and from each data memory module through its DMA.

In one embodiment, the DSPs used in the integrated circuit may be LSI Logic ZSP400 digital signal processors.

In the various embodiments of the DSP/SoC, a test port complying with the Joint Test Action Group standard can be connected to all of the DSPs to perform testing and debugging functions.

By placing more than one DSP on a semiconductor chip, the DSP/SoC system reduces the number of chips needed on a circuit board to perform digital signal processing functions. This reduction in the number of chips in turn leads to a decrease in power consumption and heat generation and a savings in costs. Processing speed is increased since the distance between DSPs and the number of interconnections among DSPs in decreased. In addition, the DSP/SoC chip uses only one host processor interface for the entire chip as opposed to one host processor interface per DSP as used by existing multi-DSP chips. This leads to a further increase in processing speed and a decrease in circuit complexity. Speed of memory access is increased in the DSP/SoC system over existing technology since the host processor interface and the memory control units do not share a common bus.

DESCRIPTION OF THE DRAWINGS

The invention, together with further advantages thereof, may best be understood by reference to the following drawing in which.

DETAILED DESCRIPTION OF THE INVENTION

Figure 1:
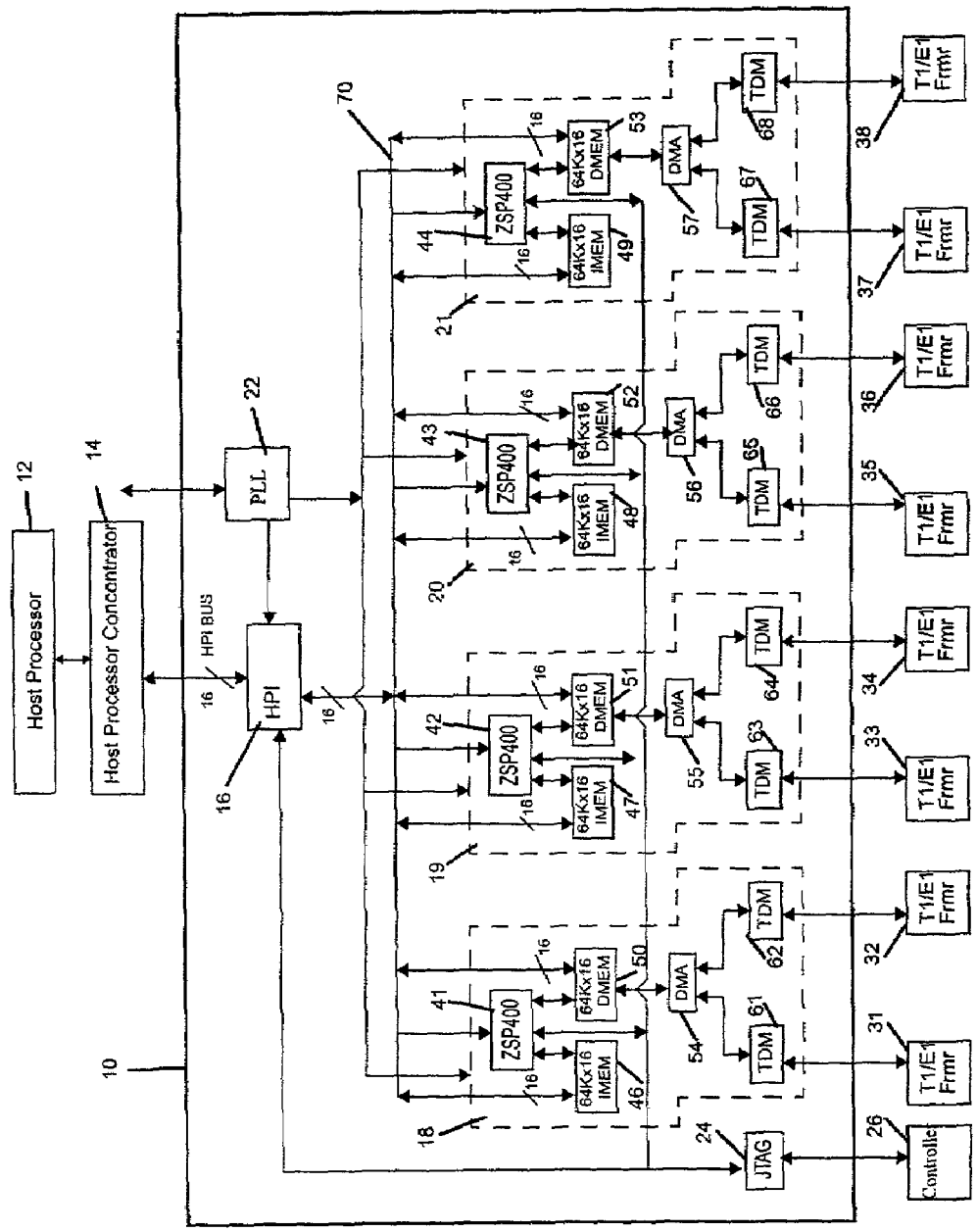
FIG. 1 is a block diagram depicting a typical configuration of a DSP/SoC multiple digital signal processor integrated circuit.

The present invention is a system-on-a-chip (SoC) integrated circuit 10 containing multiple digital signal processors (DSPs). A preferred embodiment of the invention, hereafter referred to as the DSP/SoC, is shown in FIG. 1. An external host processor 12 sends commands and data through Host Processor Concentrator 14, also external, to a Host Processor Interface (HPI) 16 which is part of the DSP/SoC semiconductor chip 10. In this embodiment, the DSP/SoC 10 is employed to process and direct voice traffic in a communications system, and the host concentrator 14 routes voice data packets, along with data and commands from the host processor to the DSP/SoC. The HPI 16 controls four digital signal processor subsystems 18–21. In alternative embodiments, a different number of subsystems could be present. A phase-locked loop clock unit (PLL) 22 controls the timing of all elements of the DSP/SoC 10 and in particular provides timing signals to clock systems within DSP subsystems 18–21. A JTAG port 24, located inside the DSP/SoC chip 10, and a JTAG controller 26, located outside the DSP/SoC chip, provide testing and debugging capabilities. The terms JTAG refers to the Joint Test Action Group IEEE 1149.1 boundary-scan standard. Eight T1/E1 framers 31, 32, 33, 34, 35, 36, 37, 38, also located outside the DSP/SoC chip 10, provide input into and receive output from the DSP/SoC. In alternative embodiments a different number of framers 31–38 could be present or other interface devices such as H.100/H.110 devices may be used instead.

In this embodiment, each digital signal processor subsystem 18–21 includes an LSI Logic ZSP400 open architecture digital signal processor core 41–44, an instruction memory area (IMEM) 46–49, a data memory area (DMEM) 50–53, a direct memory access (DMA) device 54–57, and two time division multiplexing (TDM) serial ports 61–68, respectively. The IMEMs 46–49 and DMEMs 50–53 each include an internal memory controller unit that also connects with the DSP cores 41–44, the HPI 16, and other peripherals. A common memory bus 70 provides the HPI 16 with access to the IMEMs 46–49 and DMEMs 50–53.

In the embodiment depicted in FIG. 1, the IMEMs 46–49 have an address space of 64K with each addressed site storing 16 bits. The memories are organized so that 64 bits can be read per access. This allows four read and/or write instructions to be transmitted at one time. The DMEMs 50–53 depicted have an address space of 64K and a storage size of 16 bits per address. In alternative embodiments, memory modules having other sizes for the address spaces and storage spaces could be used. In further alternative embodiments, digital signal processors other than the ZSP400 could be used and a different number of TDM serial ports could be present. For purposes of this specification, the term ZSP400 refers to any LSI Logic digital signal processor.

The HPI 16 used in a preferred embodiment of the DSP/SoC 10 is a 16-bit interface that provides the off-chip host processor 12 with access to the memory modules 4649 and 50–53 of the DSP subsystems 41–44 and the DMA memory map. It is a passive interface that has a handshake protocol to work with the intelligent host concentrator 14 to provide a fast and effective data transfer. In alternative embodiments, other types of host processor interfaces could be used.

A common internal bus 70 connects the HPI 16 to the instruction memories 46–49 and data memories 50–53 in all four subsystems 18–21. By means of this bus structure, the HPI 16 provides the host processor concentrator 14, and therefore the host processor 12, with access to the instruction memory 46–49 and data memory 50–53 in each of the subsystems 18–21. Using the HPI 16, it is possible for the host processor 12 to place program instructions (e.g., an echo canceling algorithm) into the instruction memories 46–49 of the DSP subsystems 18–21, and to place data (e.g., digital filter coefficients) into the data memories 50–53 of the DSP subsystems 18–21. This is typically done during the initialization and configuration of the DSP/SoC 10 by the host processor 12, immediately following the application of power to the IC 10. Initialization is generally necessary because memories are typically "volatile"—i.e., they do not retain instructions or data when power is removed. Consequently, if power to the DSP/SoC 10 is turned off, the contents of these memories must be restored when the IC is activated again. During the initialization process the DSPs 4144 may be held in reset, so that they do not attempt to execute program instructions from the instruction memories 46–49. Once the host 12 has completed initialization, the DSPs 41–44 are released from reset to begin normal execution. In addition to program instructions and data required by the DSPs 41–44, the DMA controllers 54–57 and TDM serial ports 61–68 may rely on configuration data contained in data memories 50–53, which must be established by the host processor 12 during initialization.

During normal operation of the DSP/SoC chip 10, after the initial programming of the DSP subsystems 18–21 is complete, digital data signals are input through the T1/E1 framers 31–38 into the TDM serial ports 61–68. Each framer 31–38 inputs data into one TDM serial port 61–68. Data from multiple TDM serial ports 61–68 then feeds into a DMAs 54–57. In FIG. 1, two TDM serial ports, e.g. 63,64, are shown feeding into one DMA, e.g. 55, but in alternative embodiments more than two TDM serial ports could feed into a single DMA. Each DMA 54–57 then sends the data to a DMEM 50–53. A DSP 41–44 acts on the data using the instructions stored in its respective IMEM 46–49. The DSP 41–44 then sends the processed data back to the DMEM 50–53. The HPI 16 polls the DSP 4144 for the completion of the processing of a frame of data. If processing is complete, the DMA 54–57 retrieves the processed data from the DMEM 50–53 and sends it to the TDM serial ports 61–68. The TDM serial ports 61–68 then send the processed data back to the T1/E1 framers 31–38.

The DMA units 54–57 include a descriptor based, multichannel, indexed DMA controller which reduces the interrupt overhead during data transfers among pairs of devices in any of the three buses. To enhance the use of the TDM serial ports 61–68, the indexed DMA channels perform sequential or indexed accesses to or from the internal Data Memory 50–53 of the Subsystems 18–21. These channels are designed specifically to work with the TDM serial ports 61–68. Data buffers can read from or write to DSP Data memory corresponding to logical TDM channels (time slots). The user specifies the buffer length and the number of buffers to service, and the DMA 54–57 controller automatically updates the pointer for each transfer within a frame. When a frame transfer completes, the pointer updates the memory address and begins transferring data for the next frame. When the DMA channel pointer reaches the last location of the last buffer, an interrupt is generated to the requester and the DMA transaction is terminated. This feature effectively automates the distribution of data from different time slots of the incoming TDM stream to a set of designated buffers.

The TDM serial ports 61–68 are synchronous serial ports that support 8 or 16-bit active or passive transfers. They allow a glueless interface to a T1/E1 framer devices or H.100/H.110 interface devices. Their control registers, input data and output data registers are memory-mapped and the DMA units 54–57 can transfer data directly between the serial port input and output registers and dual-access RAM simultaneously with other processor operations.

Figure 2:
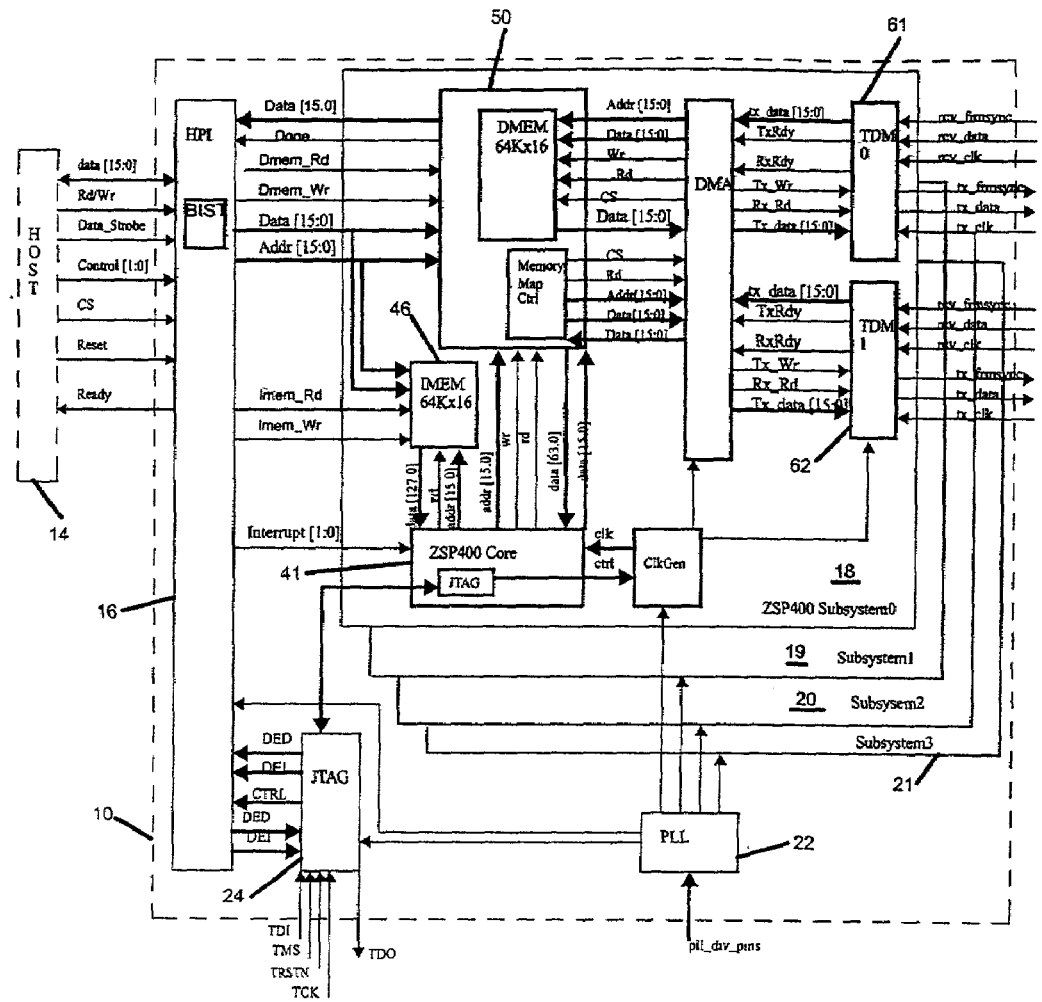
FIG. 2 is a more detailed block diagram showing signal paths between the various elements of an integrated circuit according to the present invention.

FIG. 2 provides a more detailed block diagram and signal flow chart for the DSP/SoC 10 of the present embodiment. To simplify FIG. 2, certain external elements of FIG. 1 are omitted as follows: host processor 12, controller 26, and framers 31–38. In addition, details of DSP subsystems 19–21 are omitted since they are parallel to subsystem 18. Start up and operation of the DSP/SoC will be described with reference to FIG. 2.

The DSP/SoC 10 starts operating when power is turned on and the hardware Reset signal is de-asserted by the Host Processor. Upon start-up, a reset control in the HPI 16 control registers hold all DSP subsystems 18–21 in reset mode. DSP Cores 41, etc., DMAs 54, etc, memories 46, 50, etc, and TDM serial ports 61, 62, etc. are held in Reset and in IDLE state. During this time, the HPI 16 communicates with the host processor 12 to perform self-test using BIST and JTAG. The HPI 16 is then used by the host processor 12 to store data in the DSP subsystem memory 46, 50, etc. The data are stored via memory controller interface. The data stored to the subsystem's instruction memory 46, etc. is used to configure/program the DSP Cores. The data stored to data memory 50, etc. is used to configure DMA 54, etc. and TDM serial ports 61, 62, etc. The HPI 16 has a broadcast mode that allows part or all of the DSP subsystems 18, etc. to get configuration parameters and or instruction code at the same time. When all devices in all DSP subsystems 18, etc. are configured and the programs are store in instruction memory 46, etc., the reset control in the HPI 16 control register is asserted to bring the DSP subsystems 18, etc. out of reset. An individual DSP subsystem, e.g. 18, or all subsystems can be brought out of reset the same time.

When a DSP subsystem 18, etc. comes out of reset, it will await a frame of data from its DMA 54, etc. to process (for receive direction) or data from HPI 16 to process (for transmit direction). The DMA 54, etc. and HPI 16 notify a DSP core when it has every channels' frame of data in a DSP subsystem's data memory 50, etc. ready for DSP core 41, etc. to process. The notification is done via an Interrupt control signal. Upon Interrupt notification, the DSP cores perform a data processing process that was stored in its instruction memory, for example a voice codec algorithm. The results of the DSP core's data processing is then stored to data memory. The host processor 12 polls the status of DSP cores 41, etc. to recognize the completion of processing a frame and read it (for receive direction) or instruct DMA 54 etc. to get it and send to TDM serial ports 61,62, etc. (for transmit direction).

The data memory units 51–53 are set up in circular buffer banks with programmable circular buffer pointer that allow the HPI 16, DMA 54–57, and DSP cores 41–44 to access without collision. There are three 8Kx16 and four 4Kx16 banks per subsystem so that TDM data, HPI data and Core data can access without interference of the current frame's data.

The use of a single HPI 16 for the entire multi-DSP chip 10 rather than an HPI for each DSP 41–44 reduces the complexity of the DSP/SoC system 10. The single HPI 16 used in the DSP/SoC system 10 has the capability to broadcast instructions directly to all DSPs 41–44 simultaneously or, through the use of chip select signals, it can send instructions to any one, two, or three at a time. This eliminates the need for a multiplexing unit to act as an intermediary between a host processor 12 and the DSPs 41–44. Fewer interconnections among components are needed, complexity is reduced, and programming is simplified in the DSP/SoC system 10 as opposed to existing technology since only one HPI 16 is used and no multiplexor is present. Also, because the HPI 16 does not share a bus with the memory modules, the HPI and the memory modules can be active simultaneously with no loss of data processing speed.

The JTAG test port 24, complying with the Joint Test Action Group (JTAG) standard, also known as IEEE Standard 1149.1, is connected to all of the DSPs 41–44 in the DSP/SoC system 10 and to the HPI 16 to perform testing and debugging functions. The JTAG port provides access to all on-chip resources. A ZSP400 in-circuit emulator (ICE) can be operated via the JTAG port 24 to allow full visibility and control of all ZSP400 cores. The JTAG port 24 also has the capability to read from and write to all memory in the system while the system is running by multiplexing into the DSP/SoC system 10.

While the present invention has been illustrated and described in terms of particular apparatus and methods of use, it is apparent that equivalent parts may be substituted for those shown and other changes can be made within the scope of the present invention as defined by the appended claims.

What is claimed is:

1. An integrated circuit comprising:
   a host processor interface;
   a common memory bus coupled to said host processor interface;
   a plurality of memory devices, each of said plurality of memory devices coupled to said common memory bus; and
   a plurality of digital signal processors, each one of said plurality of digital signal processors associated with and coupled to a corresponding one of said plurality of memory devices.

2. The integrated circuit of claim 1, wherein each one of said plurality of memory devices are connected to said host processor interface by said common memory bus.

3. The integrated circuit of claim 1, wherein each one of said plurality of digital signal processors are connected to said common bus by said corresponding one of said plurality of memory devices.

4. The integrated circuit of claim 3, wherein each on of said plurality of memory devices are connected to said host processor interface by said common memory bus.

5. An integrated circuit comprising:
   a plurality of digital signal processors;
   a host processor interface coupled to a host processor and to said plurality of digital signal processors;
   a plurality of memory devices, each associated with and coupled to one of said plurality of digital signal processors and each coupled to said host processor interface;
   a plurality of direct memory access devices, each associated with one of said plurality of digital signal processors and each coupled to the memory d vic associated with the respective digital signal processor; and
   at least two time division multiplexing devices associate with each digital signal processor and coupled to the direct memory access device associated with each digital signal processor, each time division multiplexing device including a signal port for receiving and sending signals.

6. The integrated circuit of claim 4 wherein:
   each memory device comprises an instruction memory device and a data memory device and each direct memory access device is coupled to a data memory device.

7. The integrated circuit of claim 6, further comprising:
   a common memory bus coupling each of said instruction memory and data memory devices to said host processor interface.

8. The integrated circuit of claim 1 further comprising an IEEE Standard 1149.1 compliant testing module connected to all digital signal processors on the integrated circuit.

9. An integrated circuit according to claim 1 wherein:
   said digital signal processors comprise ZSP400 digital signal processors.

10. The integrated circuit of claim 9 further comprising:
an IEEE Standard 1149.1 compliant testing module connected to all digital signal processors on the integrated circuit.

11. An integrated circuit comprising:
at least two ZSP400 digital signal processors;
a host processor interface coupled to said at least two ZSP400 digital signal processors;
an instruction memory module and controller for and coupled to each digital signal processor;
a data memory module and controller for and coupled to each digital signal processor and to said host processor interface;
a direct memory access device for and coupled to each data memory module; and
at least two time division multiplexing devices for and coupled to each data memory module.

12. The integrated circuit of claim 11 further comprising:
a common bus coupling each of said instruction memory modules and each of said data memory modules to said host processor interface.

13. A method of operating at least two digital signal processors on a single integrated circuit comprising:
coupling said at least two digital signal processors to a host processor using a single host processor interface coupled to a common memory bus coupled to at least two memory devices coupled to respective ones of said at least two digital signal processors.

14. The method of claim 13 wherein:
each of said digital signal processors comprises a ZSP400 digital signal processor.

15. A method of operating at least two digital signal processors on a single integrated circuit comprising:
coupling said at least two digital signal processors to a host processor using a single host processor interface;
providing an instruction memory and a data memory for each digital signal processor; and
coupling each instruction memory and data memory to its respective digital signal processor and to said host processor interface.

16. A method according to claim 15 further including:
using a common memory bus to couple each instruction memory and each data memory to the single host processor interface.

17. The method of claim 15 further comprising:
providing a direct memory access device for each data memory; and
coupling each direct memory access device to its respective data memory.

18. The A method operating at least two digital signal processors on a single integrated circuit comprising:
coupling said at least two digital signal processors to a host processor using a single host processor interface; and
coupling said digital signal processors to multiple framers by:
(a) coupling one direct memory access device to each digital signal processor,
(b) coupling at least two time division multiplexing devices to each direct memory access device; and
(c) coupling one framer to each time division multiplexing device.

19. A method operating at least two ZSP400 digital signal processors on a single integrated circuit comprising:
coupling said ZSP400 digital signal processors to a host processor using a single host processor interface; and
coupling said ZSP400 digital signal processors to multiple framers by:
coupling one direct memory access device to each digital signal processor;
coupling at least two time division multiplexing devices to each direct memory access device; and
coupling one framer to each time division multiplexing device.

20. The method of claim 19 further comprising:
coupling each direct memory access device to a digital signal processor by coupling a data memory unit to both said direct memory access device and said digital signal processor.

* * * * *